(12) United States Patent
Katsuya et al.

(10) Patent No.: US 12,109,742 B2
(45) Date of Patent: Oct. 8, 2024

(54) SPACE FILLING MATERIAL AND SPACE FILLING STRUCTURE, AND METHODS FOR USING THOSE

(71) Applicant: KURARAY CO., LTD., Kurashiki (JP)

(72) Inventors: Satoshi Katsuya, Okayama (JP); Ryokei Endo, Tokyo (JP); Yosuke Washitake, Okayama (JP); Shunsuke Suiko, Osaka (JP)

(73) Assignee: KURARAY CO., LTD., Kurashiki (JP)

(*) Notice: Subject to any disclaimer, the term of this patent is extended or adjusted under 35 U.S.C. 154(b) by 492 days.

(21) Appl. No.: 17/464,744

(22) Filed: Sep. 2, 2021

(65) Prior Publication Data
US 2021/0394406 A1    Dec. 23, 2021

Related U.S. Application Data

(63) Continuation of application No. PCT/JP2020/002869, filed on Jan. 28, 2020.

(30) Foreign Application Priority Data

Mar. 13, 2019  (JP) .................... 2019-046240

(51) Int. Cl.
*B32B 7/02* (2019.01)
*B29C 44/34* (2006.01)
(Continued)

(52) U.S. Cl.
CPC ......... *B29C 44/3492* (2013.01); *D04H 1/488* (2013.01); *C08L 101/12* (2013.01)

(58) Field of Classification Search
CPC ... B29C 44/3492; B29C 44/358; B29C 61/04; C08L 101/12; D04H 1/4218;
(Continued)

(56) References Cited

U.S. PATENT DOCUMENTS

| | | | |
|---|---|---|---|
| 5,996,228 A | 12/1999 | Shoji et al. | |
| 2019/0329525 A1 | 10/2019 | Nonaka et al. | |
| 2020/0055276 A1 | 2/2020 | Katsuya et al. | |

FOREIGN PATENT DOCUMENTS

| | | |
|---|---|---|
| CN | 109183269 A | 1/2019 |
| JP | 7-18249 A | 1/1995 |

(Continued)

OTHER PUBLICATIONS

Extended European Search Report issued Nov. 4, 2022 in Patent Application No. 20769771.5, 8 pages.
(Continued)

*Primary Examiner* — Lawrence D Ferguson
(74) *Attorney, Agent, or Firm* — Element IP, PLC

(57) ABSTRACT

Provided are a space filling material and a space filling structure capable of filling a predetermined space for various purposes, and method for using those. A space filling material (11) includes reinforcing fibers as an expansion material and a resin. The reinforcing fibers form a plurality of intersections and are bonded with the resin at at least one of the intersections. Heating of the space filling material causes an expansion stress in at least a thickness direction (X) such that the space filling material fills a predetermined space (13). For example, the space filling material may contain the resin at a volume ratio of 15 to 95 vol % based on a total volume of the reinforcing fibers and the resin.

22 Claims, 2 Drawing Sheets

(51) Int. Cl.
*D04H 1/488* (2012.01)
*C08L 101/12* (2006.01)

(58) Field of Classification Search
CPC ........ D04H 1/488; D04H 1/542; D04H 1/549;
D04H 1/558; D04H 1/732
See application file for complete search history.

(56) References Cited

FOREIGN PATENT DOCUMENTS

| | | |
|---|---|---|
| JP | H08-174687 A | 7/1996 |
| JP | 9-946 A | 1/1997 |
| JP | 2002127136 A | 5/2002 |
| JP | 2003262116 A | 9/2003 |
| JP | 2015229959 A | 12/2015 |
| JP | 2016074197 A | 5/2016 |
| WO | WO-2018092888 A1 | 5/2018 |
| WO | WO-2018199091 A1 | 11/2018 |

OTHER PUBLICATIONS

International Search Report issued Mar. 24, 2020 in PCT/JP2020/002869 (with English translation), 6 pages.
English translation of the International Preliminary Report on Patentability and Written Opinion issued Sep. 23, 2021 in PCT/JP2020/002869, 16 pages.

SPACE FILLING MATERIAL AND SPACE FILLING STRUCTURE, AND METHODS FOR USING THOSE

CROSS REFERENCE TO THE RELATED APPLICATION

This application is a continuation application, under 35 U.S.C § 111(a) of international application No. PCT/JP2020/002869, filed Jan. 28, 2020, which claims priority to Japanese patent application No. 2019-046240, filed Mar. 13, 2019, the entire disclosures of all of which are herein incorporated by reference as a part of this application.

BACKGROUND OF THE INVENTION

The present invention relates to a space filling material being capable of filling a predetermined space via an expansion stress caused by heating and to a space filling structure comprising the space filling material, and to methods using thereof.

Heat-expansive composite materials have been conventionally known. The heat-expansive composite materials are expansive during heating so as to exhibit sealing function for fire prevention as well as smoke prevention. For example, Patent Document 1 (JP Laid-open Patent Publication No. 7-18249) discloses a heat-expansive inorganic fibrous composite material characterized in that a mixture of an acid-treated graphite as an expansion agent, inorganic fibers as a heat-resistant reinforcing material, an inorganic binder as a heat-resistant binder, and an organic binder material as a shape-retaining material before heating, is formed into a sheet by a papermaking process. Patent Document 1 recites that the composite material can be used as a sealing material for a fire-resisting door.

SUMMARY OF THE INVENTION

Problems to be Solved by the Invention

However, the heat-expansive inorganic fibrous composite material in Patent Document 1 is used for not much more than performing a sealing function for tire prevention, smoke prevention, etc. Furthermore, the heat-expansive inorganic fibrous composite material in Patent Document 1 requires the acid-treated graphite as the expansion agent. The acid-treated graphite generates gas such as aqueous vapor due to thermal cracking of intercalation compounds of the graphite upon heating, and consequently exhibits expansive property. Such an expansion agent, however, could not be used where generation of gas is not preferable. Moreover, the acid-treated graphite may lead to generation of harmful gases such as SOx and NOx derived from acid.

Therefore, an object of the present invention is to solve such a problem in the conventional art, that is, to provide a space filling material being capable of filling a desired space with an intended use while avoiding gas generation during heat-expansive procedure, and a method of using same.

Means to Solve Problems

As a result of intensive studies to solve the problems, the present inventors have found that: (i) in a case where the space filling material includes reinforcing fibers as an expansion material and a resin, wherein the reinforcing fibers form a plurality of intersections and are bonded with the resin at at least one of the intersections, expansion is occurred when bending loads of the reinforcing fibers in bent forms are released by softening the resin, leading to no generation of gas; and (ii) repulsive force of the reinforcing fibers when the bending loads are released are so large that the reinforcing fibers can be appropriately used in filling the predetermined space depending on the intended use. As a result, the present invention has been completed by the present inventors.

That is, the present invention may include the following aspects.

Aspect 1

A space filling material comprising:
reinforcing fibers as an expansion material, the reinforcing fibers forming a plurality of intersections (cross-over points), and
a resin bonding at least one of the intersections; and
the space filling material generating an expansion stress upon heating in at least a thickness direction such that the space filling material fills (is capable of filling) a predetermined space.

Aspect 2

The space filling material according to aspect 1, wherein the space filling material contains the resin at a volume ratio of 15 to 95 vol % (preferably 17 to 93 vol %, more preferably 20 to 90 vol %, still more preferably 25 to 85 vol %) based on a total volume of the reinforcing fibers and the resin.

Aspect 3

The space filling material according to aspect 1 or 2, wherein the reinforcing fibers are in bent forms each receiving a bending load; and softening of the resin releases the bending load to make the space filling material to be expanded.

Aspect 4

The space filling material according to any one of aspects 1 to 3, wherein the space filling material has an expansion ratio of 105% or more (preferably 120% or more, more preferably 140% or more, still more preferably 150% or more, yet more preferably 170% or more) at a constant load in the thickness direction.

Aspect 5

The space filling material according to any one of aspects 1 to 4, wherein the space filling material after expanded has a deformation ratio of −10% to 10% (preferably −8% to 8%, more preferably −5% to 5%) in a direction perpendicular to the thickness direction.

Aspect 6

The space filling material according to any one of aspects 1 to 5, wherein the resin is a thermoplastic resin.

Aspect 7

The space filling material according to aspect 6, wherein the thermoplastic resin has a glass transition temperature of 100° C. or higher (preferably 105° C. or higher, more preferably 110° C. or higher).

Aspect 8

The space filling material according to aspect 6 or 7, wherein the thermoplastic resin is at least one thermoplastic resin selected from a group consisting of a thermoplastic polyimide-based resin, a polyether ketone-based resin, a semi-aromatic polyamide-based resin, a polycarbonate-based resin, a liquid crystal polyester-based resin, a polysulfone-based resin, and a polytetrafluoroethylene-based resin (preferably a group consisting of a thermoplastic polyimide-based resin, a polyether ketone-based resin, a semi-aromatic polyamide-based resin, a polycarbonate-based resin, and a polysulfone-based resin).

Aspect 9

The space filling material according to any one of aspects 1 to 8, wherein the reinforcing fibers have a fiber length of 3 to 100 mm (preferably 4 to 80 mm, more preferably 5 to 50 mm).

Aspect 10

The space filling material according to any one of aspects 1 to 9, wherein the reinforcing fibers are insulative fibers.

Aspect 11

The space filling material according to any one of aspects 1 to 10, wherein the space filling material has a porosity of 3 to 75% (preferably 5 to 70%, more preferably 10 to 65%).

Aspect 12

The space filling material according to any one of aspects 1 to 11, wherein the space filling material is used for fixing a material to be fixed in the predetermined space.

Aspect 13

A space filling structure comprising the space filling material as recited in aspect 12 and a material to be fixed, the material(s) being integrated in contact with at least a part of the space filling material.

Aspect 14

The space filling structure according to aspect 13, wherein the material to be fixed is sandwiched between the space filling materials.

Aspect 15

A method of using the space filling material as recited in any one of aspects 1 to 12, the method comprising:
heating the space filling material at a temperature of softening temperature of the resin or higher so as to expand the space filling material in the predetermined space.

Aspect 16

The method according to aspect 15 comprising inserting the space filling material into the predetermined space.

Aspect 17

A method of using the space filling material as recited in any one of aspects 1 to 12 or the space filling structure as recited in aspect 13 or 14, the method comprising:
heating the space filling material or the space filling structure at a temperature of softening temperature of the resin or higher so as to expand the space filling material(s) in the predetermined space and fix the material to be fixed.

Aspect 18

The method according to aspect 17 comprising inserting the space filling material and/or the material to be fixed, or the space filling structure, into the predetermined space.

Aspect 19

The method according to any one of aspects 15 to 18, wherein the expanded space filling material has a porosity of 30 to 95% (preferably 35 to 90%, more preferably 40 to 85%, still more preferably 45 to 80%).

Aspect 20

The method according to any one of aspects 15 to 19, wherein the expanded space filling material has a continuous porous structure.

Aspect 21

The method according to any one of aspects 15 to 20, wherein the expanded space filling material has a density of 0.1 to 1.5 g/cm$^3$ (preferably 0.2 to 1.4 g/cm$^3$, more preferably 0.3 to 1.3 g/cm$^3$).

The present invention encompasses any combination of at least two features disclosed in the claims and/or the specification and/or the drawings. In particular, the present invention encompasses any combination of at least two claims.

Effects of the Invention

The present invention can provide a space filling material which expands without generating gas when it is heated and therefore it can be used for filling a predetermined space for various purposes.

BRIEF EXPLANATION OF THE DRAWINGS

The present invention will be more clearly understood from the preferred embodiments described below with reference to the attached drawings. However, the drawings are not necessarily shown on a fixed scale, and may be exaggerated in showing the principle according to the present invention. The embodiments and the drawings are merely illustrative and explanatory, and should not be used for defining the scope according to the present invention. The scope according to the present invention is defined by the attached claims.

DESCRIPTION OF THE EMBODIMENTS

Figure 1A:
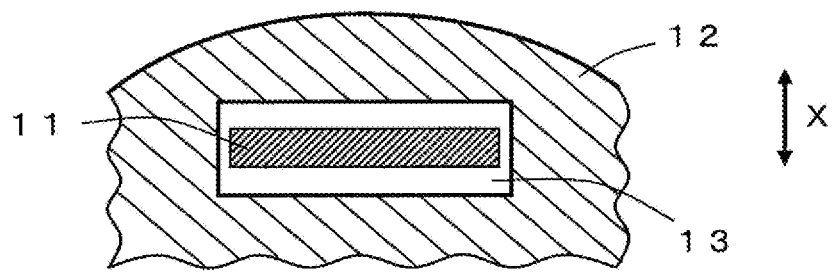
FIG. 1A is a schematic sectional view for illustrating a method of using a space filling material according to a first embodiment of the present invention, in which the space filling material is in a state before expansion.

Hereinafter, an embodiment of the present invention will be described. A space filling material according to the present invention comprises reinforcing fibers as an expansion material, and a resin. The reinforcing fibers form a plurality of intersections between each other, and are bonded with the resin at at least one of the intersections. Heating of the space filling material causes an expansion stress in at least a thickness direction such that the space filling material can fill a predetermined space. Here, "expansion stress" indicates a stress to an external member generated by an expanded space filling material, which is enclosed by the external member. The space filling material may fill all of or a part of the predetermined space within the external member.

Reinforcing Fibers as Expansion Material

The reinforcing fibers used in the present invention are not particularly limited to a specific species as long as the effect of the present invention is not significantly impaired. The reinforcing fibers may be organic fibers or inorganic fibers. The reinforcing fibers may be used singly, or in combination of more than two species thereof. According to the present invention, reinforcing fibers that are in bent forms and bonded with the resin in the space filling material are under bending loads. Such bending loads will be released when the resin is softened so as to exert repulsive force, resulting in expansion of the space filling material. The reinforcing fibers as expansion material as used herein indicate reinforcing fibers applicable to such a principle and enabling a space filling material to be expanded.

Examples of the inorganic fibers may include glass fibers, carbon fibers, various ceramic fibers (for example, silicon carbide fibers, silicon nitride fibers, silica fibers, alumina fibers, zirconia fibers, boron fibers, basalt fibers, etc.), various metal fibers (for example, fibers of gold, silver, copper, iron, nickel, titanium, stainless steel, etc.), and the like. The species of organic fibers is not particularly limited to a specific one as long as organic fibers have a glass transition temperature or a melting point higher than the softening temperature or the curing temperature of the resin bonding the intersection of the reinforcing fibers. Examples of the organic fibers may include wholly aromatic polyester-based fibers, polyphenylene sulfide-based fibers, para-aramide-based fibers, polysulfonamide-based fibers, phenol resin-based fibers, polyimide-based fibers, and fluorine-containing fibers, and the like. It should be noted that, in the present invention, where the resin is a thermoplastic resin, the softening temperature mainly indicates a thermal deformation temperature. For example, the softening temperature may be a deflection temperature under load (JIS K 7207). Where the resin is an amorphous resin, the softening temperature means the glass transition temperature thereof. Where the resin is a thermosetting resin, the softening temperature means a melting point of a prepolymer component of a uncured or semi-cured thermosetting resin. The curing temperature as used herein indicates a temperature at which an uncured or semi-cured thermosetting resin is cured.

Among these fibers, from the viewpoint of increasing the repulsive force upon expanding the space filling material, utilization of inorganic fibers having a high elastic modulus such as glass fibers or carbon fibers is preferable. Furthermore, where a structure including an expanded space filling material is used in applications requiring insulation, the fibers may be insulative fibers (for example, glass fibers, silicon nitride fibers, silica fibers, alumina fibers, etc.).

The reinforcing fibers as used in the present invention may be discontinuous fibers, and the average fiber length thereof may be preferably 3 to 100 mm, more preferably 4 to 80 mm, still more preferably 5 to 50 mm, from the viewpoint of increasing the repulsive force of the fibers. It should be noted that the average fiber length is a value measured by the method described in Examples later.

The reinforcing fibers used in the present invention may have an average fiber diameter of a single fiber of 2 to 40 µm, more preferably 3 to 30 µm, still more preferably 4 to 25 µm, from the viewpoint of increasing the repulsive force of the fibers. It should be noted that the average fiber diameter is a value measured by the method described in Examples later.

The reinforcing fibers used in the present invention may have a tensile elastic modulus of 10 GPa or higher, more preferably 30 GPa or higher, still more preferably 50 GPa or higher, from the viewpoint of increasing the repulsive force of the reinforcing fibers. The upper limit of the tensile elastic modulus is not particularly limited, but may be 1000 GPa or lower. It should be noted that the tensile elastic modulus can be measured by a method conforming with the standard suitable for each type of fibers, such as JIS R 7606 for carbon fibers, JIS R 3420 for glass fibers, and JIS L 1013 for organic fibers.

Resin

The resin used in the present invention is not particularly limited to a specific one as long as the resin is capable of heat-melting or heat-flowing. The resin may be a thermoplastic resin, or uncured/sub-cured thermosetting resin. Examples of the thermosetting resin may include an epoxy-based resin, an unsaturated polyester-based resin, a thermosetting polyimide-based resin, a bismaleimide-based resin, a phenol-based resin, a melamine-based resin, and a thermosetting polyurethane-based resin. From the viewpoint of flowability of the resin and facility of conditions such as a temperature at the time of expansion of the space filling material, the thermoplastic resin is preferred. Examples of the thermoplastic resin may include a vinyl-based resin (a polymer or derivative obtained from monomers having a vinyl group ($CH_2=CH-$) or a vinylidene group ($CH_2=C<$); a polyamide-based resin such as an aliphatic polyamide-based resin (a polyamide 6, a polyamide 66, a polyamide 11, a polyamide 12, a polyamide 610, a polyamide 612, etc.), a semi-aromatic polyamide-based resin, and a wholly aromatic polyamide-based resin; a polyester-based resin such as a polyethylene terephthalate, a polytrimethylene terephthalate, a polybutylene terephthalate, and a polyethylene naphthalate; a fluorine-containing resin such as a polytetrafluoroethylene-based resin; a thermoplastic polyimide-based resin such as a semi-aromatic polyimide-based resin, a polyamideimide-based resin, and a polyetherimide-based resin; a polysulfone-based resin such as a polysulfonic-based resin and a polyethersulfic-based resin; a polyether ketone-based resin such as a polyether ketone-based resin, a polyether ether ketone-based resin, and a polyether ketone ketone-based resin; a polycarbonate-based resin; an amorphous polyarylate-based resin; a liquid crystal polyester-based resin such as a wholly aromatic polyester-based resin; and others. These thermoplastic resins may be used singly or in combination of two or more.

Moreover, a thermosetting elastomer and/or a thermoplastic elastomer may be used as a resin component. In such a case, examples of the elastomer may include a silicon-/silicone-based elastomer, a fluorine-based elastomer, a urethane-based elastomer, a styrene-based elastomer, an olefin-based elastomer, a vinyl chloride-based elastomer, an ester-based elastomer, and an amide-based elastomer. These resins may be used singly or in combination of two or more. Further these resins may be used in combination with the above-mentioned thermosetting resin(s) or thermoplastic resin(s).

Further, the thermoplastic resin used in the present invention may be preferably a thermoplastic resin having a glass transition temperature of 100° C. or higher in the case of an application requiring heat resistance in a structure including an expanded space filling material. Examples of a thermoplastic resin having a glass transition temperature of 100° C. or higher may include a polytetrafluoroethylene-based resin, a thermoplastic polyimide-based resin, a polysulfone-based resin, a semi-aromatic polyamide-based resin, a polyether ketone-based resin, a polycarbonate-based resin, a liquid crystal polyester-based resin, and the like. Of these, from the viewpoint of mechanical properties and moldability, the thermoplastic resin may be at least one thermoplastic resin selected from a group consisting of a thermoplastic polyimide-based resin (preferably a polyetherimide-based resin), a polyether ketone-based resin (preferably a polyether ether ketone-based resin) a semi-aromatic polyamide-based resin, a polycarbonate-based resin and a polysulfone-based resin. In the applications requiring heat resistance, the glass transition temperature of the thermoplastic resin may be preferably 105° C. or higher, more preferably 110° C. or higher. Although there is no specific upper limit, the glass transition temperature may be preferably 300° C. or lower. It should be noted that the glass transition temperature is a value measured by the method described in Examples later.

Further, the resin used in the present invention may contain various additives as long as the effects of the present invention are not impaired.

Method of Producing Space Filling Material

Method of producing a space filling material is not particularly limited as long as reinforcing fibers have a plurality of intersections and are bonded with a resin at at least one of the intersections. The method may comprise preparing an intermediate material (precursor) comprising reinforcing fibers and a resin, and heating and pressurizing the intermediate material.

Where a thermosetting resin is used as the resin, examples of the method may comprise stacking one or a plurality (for example, from 2 to 100, preferably from 3 to 80, more preferably from 5 to 50) of nonwoven fabrics containing reinforcing fibers, allowing the stacked material to be impregnated with a liquid prepolymer of a thermosetting resin, subjecting the impregnated material to thermo-compression, and then cooling the heated material while being compressed, whereby an intermediate material containing a semi-cured thermosetting resin can be produced as a prepreg.

Where a thermoplastic resin is used as the resin, it is possible for an intermediate material to have various forms before heating and pressurizing. Preferable examples of the method may comprise stacking one or a plurality (for example, from 2 to 100, preferably from 3 to 80, more preferably from 5 to 50) of mixed nonwoven fabrics containing reinforcing fibers and thermoplastic fibers, or nonwoven fabric containing reinforcing fibers and particulate (or powdery) thermoplastic resin dispersed in the fabric, heating the stacked material at a temperature equal to or higher than the softening temperature of the thermoplastic resin with compressing in the stacked direction, and then cooling the heated material while being compressed. Preferably, the intermediate material may be a mixed nonwoven fabric of thermoplastic fibers and reinforcing fibers.

From the viewpoint of increasing expansive property of the obtained space filling material and the expansion stress caused by the space filling material during heating, the mixed nonwoven fabric may preferably have a proportion of reinforcing fibers of 10 to 90 wt %, more preferably 15 to 85 wt %, still more preferably 20 to 80 wt % in the total weight of the mixed nonwoven fabric.

From the viewpoint of increasing expansive property of the obtained space filling material and the expansion stress caused by the space filling material during heating, the mixed nonwoven fabric used in the present invention may have a proportion of thermoplastic fibers of 10 to 90 wt % (for example, 10 to 80 wt %), more preferably 15 to 85 wt % (for example, 15 to 75 wt %), still more preferably 20 to 80 wt % (for example, 20 to 75 wt %) in the total weight of the mixed nonwoven fabric.

The thermoplastic fibers may preferably have a single fiber fineness of 0.1 to 20 dtex from the viewpoint of improving the dispersibility of the reinforcing fibers. In order to obtain a space filling material having excellent expansion stress during heating, it is desirable to homogeneously disperse the reinforcing fibers in the mixed nonwoven fabric to be used as an intermediate material. The thermoplastic fibers may have a single fiber fineness of more preferably 0.5 to 18 dtex, still more preferably 1 to 16 dtex. It should be noted that the single fiber fineness is a value measured by the method described in Examples later.

The thermoplastic fibers may have an average fiber length of preferably 0.5 to 60 mm, more preferably 1 to 55 mm, still more preferably 3 to 50 mm from the viewpoint of improving the dispersibility of the reinforcing fibers. It should be noted that the average fiber length is a value measured by the method described in Examples later. The cross-sectional shapes of the fibers are not particularly limited, and may be a circular, hollow, flat, or modified cross-sectional shape such as a star shape.

Further, if necessary, the mixed nonwoven fabric may contain a binder component or the like. The shape of the binder component may be fibrous, particulate, liquid or the like, and from the viewpoint of forming the nonwoven fabric, binder fibers are preferred. The binder component is not particularly limited to a specific one, and examples of the binder component may include a polyolefin-based resin, a polyamide-based resin, a polyester-based resin, an acrylic resin, a polyvinyl alcohol-based resin, and a polyurethane-based resin, and others.

The method for producing the nonwoven fabric is not particularly limited to a specific one, and examples of the method may include a spunlace method, a needle punching method, a steam jet method, a dry-laid papermaking method, and a wet-laid papermaking method (wet-laid process), and others. Of these, preferred one may include a wet-laid papermaking method in view of production efficiency and uniform dispersion of the reinforcing fibers in the nonwoven fabric. For example, in the wet-laid papermaking method, an aqueous slurry containing the thermoplastic fibers and the reinforcing fibers may be prepared, and then this slurry may be subjected to a normal papermaking process. The aqueous slurry may contain binder fibers (for example, water-soluble polymer fibers such as polyvinyl alcohol-based fibers, heat-fusible fibers such as polyester fibers, pulp-like materials of para-aramid fibers or wholly aromatic polyester fibers), and others. Further, in order to improve the uniformity and pressure bonding property of the paper, a binder component may be applied under spray dry, or a hot-pressing process may be added after the wet-laid papermaking process.

The basis weight of the nonwoven fabric is not particularly limited to a specific one, and may be preferably 5 to 1500 g/m$^2$, preferably 10 to 1000 g/m$^2$, and even more preferably 20 to 500 g/m$^2$.

Further, the method of producing the space filling material, may comprise heat-molding, which is not particularly limited to a specific one. Heat-molding may be preferably carried out using a general compression molding such as stampable molding, a pressure molding, a vacuum compression molding, and a GMT molding. The molding temperature may be suitably set depending on a softening temperature and decomposition temperature of a thermoplastic resin to be used, a softening temperature, drying temperature (semi-curing temperature) and a curing temperature of an uncured or semi-cured thermosetting resin. For example, where the thermoplastic resin is crystalline, the molding temperature is preferably in a range of the melting point of the thermoplastic resin or higher and (melting point+100)° C. or lower. Where the thermoplastic resin is amorphous, the molding temperature is preferably in a range of the glass transition temperature of the thermoplastic resin or higher and (glass transition temperature+200)° C. or lower. If necessary, preheating using an IR heater or the like may be carried out before heat-molding.

Further, the pressure at the time of heat-molding is not particularly limited to a specific one, and may be usually carried out at a pressure of 0.05 MPa or higher, more preferably 0.1 MPa or higher, still more preferably 0.5 MPa or higher. The upper limit is not particularly limited, and may be about MPa. The heat-molding time is not also particularly limited to a specific one, and may be usually preferably 30 minutes or shorter, because exposure to a high temperature for a longer period may deteriorate property of the heated polymer. The heat-molding time may be more preferably in a range of 25 minutes or shorter, and even more preferably 20 minutes or shorter. The lower limit of the heat-molding time is not particularly limited to a specific one, and may be about 1 minute. Further, the thickness as well as the density of the obtained space filling material can be appropriately set depending on the type of reinforcing fibers and the pressure applied. Furthermore, the shape of the obtained space filling material is not particularly limited to a specific one, and can be set as appropriate. Depending on purpose, it is also possible to stack a plurality of mixed nonwoven fabrics each having different formulations or configurations, or to arrange mixed nonwoven fabrics each having different formulations or configurations separately in a mold of a certain size, and then to perform heat-molding.

Space Filling Material

The space filling material according to the present invention comprises reinforcing fibers as an expansion material and a resin. The reinforcing fibers form a plurality of intersections; and the resin bonds at least one of the intersections. For example, the reinforcing fibers may be bonded to each other with the resin in a state of being randomly entangled with each other. Preferably, the resin may be present in a webbed (flippered) shape at the intersections of the reinforcing fibers, and the entire surface of the reinforcing fibers may be covered with the resin. Such a structure enables to improve structural strength of the space filling material.

The space filling material according to the present invention may fill a predetermined space at least in the thickness direction by the expansion stress upon heating. In the present invention, the predetermined space may be a space (gap) enclosed by a single external member, or a space (gap) enclosed by a plurality of external members.

In the method of producing a space filling material as described above, a pressure is applied to the space filling material in the thickness direction during heat-molding so that the pressurized space filling material has reinforcing fibers in bent forms each receiving a bending load accordingly. Upon heating the space filling material, a resin matrix surrounding the reinforcing fibers comes to be softened and release the bending loads of the reinforcing fibers. As a result, since the release of the bending loads of the reinforcing fibers causes repulsive forces (restoring forces) in the thickness direction of the space filling material, expansion stress of the space filling material generates in the thickness direction of the space filling material.

The space filling material according to the present invention may preferably comprise reinforcing fibers in bent forms each receiving a bending load. By heating the space filling material at a temperature equal to or higher than the softening temperature of the resin in a predetermined space, the resin in the space filling material is softened so as to release the bending load of the reinforcing fibers. As a result, the space filling material expands due to the repulsion of the reinforcing fibers. Development of the expansion stress during heating achieves excellent strength of the space filling material to reinforce when filled in a predetermined space as well as to fix a material to be fixed in a predetermined space.

From the viewpoint of increasing expandability and expansion stress during heating, the space filling material according to the present invention may preferably contain reinforcing fibers in a proportion of 10 to 90 wt %, more preferably 15 to 85 wt %, still more preferably 20 to 80 wt %, based on the total weight of the space filling material.

From the viewpoint of increasing expandability and expansion stress during heating, the space filling material according to the present invention may preferably contain a resin in a proportion of 10 to 90 wt %, more preferably 15 to 85 wt %, still more preferably 20 to 80 wt %, based on the total weight of the space filling material. It should be noted that a binder component used as needed may be included as the resin in the space filling material.

From the viewpoint of increasing expandability and expansion stress during heating, the space filling material according to the present invention may preferably contain a resin at a volume ratio of 15 to 95 vol % based on a total volume of the reinforcing fibers and the resin. Where the resin has a too small volume ratio comparing with that of reinforcing fibers, the space filling material expanded in a predetermined space may have a small contact area of the resin relative to wall surface(s) enclosing the space in the space (or a material(s) to be fixed). As a result, there is a possibility that the space filling material may have insufficient stress that contributes to the strength for fixing the space filling material against the wall surface or the material to be fixed. In contrast, where the resin has a too large volume ratio comparing with that of reinforcing fibers, there is a possibility that an amount of reinforcing fibers as an expansion material may be too insufficient to achieve satisfactory expanding property of the space filling material. The space filling material according to the present invention may contain a resin at a volume ratio of preferably 17 to 93 vol %, more preferably 20 to 90 vol %, still more preferably 25 to 85 vol %, based on a total volume of the reinforcing fibers and the resin.

From the viewpoint of increasing expandability and expansion stress during heating, the space filling material according to the present invention may contain reinforcing fibers at a volume ratio of 5 to 85 vol %, preferably 7 to 83 vol %, more preferably 10 to 80 vol %, still more preferably 15 to 75 vol %, based on a total volume of the reinforcing fibers and the resin.

From the viewpoint of increasing expandability and expansion stress during heating, the space filling material according to the present invention may have a porosity of 3 to 75% in a state of before expansion or before use. Where the space filling material has a too small porosity before expansion, the reinforcing fibers in the space filling material are rendered to receive an excessive compressive force so that the reinforcing fibers may be broken or flowed. As a result, even if the space filling material is heated to restore bending forms of reinforcing fibers, there is a possibility that the space filling material may realize unsatisfactory expansibility and expansion stress during heating. Further, where the space filling material has a too large porosity before expansion, since there is little room for expansion, there is a possibility that the space filling material may realize unsatisfactory expandability. The space filling material may have a porosity of preferably 5 to 70%, more preferably 10 to 65% in a state of before expansion or before use. It should be noted that the porosity here indicates a volume ratio occupied by voids relative to a bulk volume of the space filling material, and is a value measured by the method described in Examples later.

The space filling material according to the present invention can have various thicknesses depending on a space to be filled and an intended use, and may be selected from a wide range of, for example, 0.1 to 200 mm. The thickness may be, for example, 0.1 to 20 mm, preferably 0.5 to 18 mm, and more preferably 1 to 15 mm. The thickness of the space filling material is a value measured by the method described in Examples later.

The space filling material according to the present invention can have various basis weights depending on a space to be filled and an intended use, and may have a basis weight of 100 to 10000 g/m$^2$, preferably 500 to 8000 g/m$^2$, more preferably 800 to 5000 g/m$^2$. The basis weight of the space filling material is a value measured by the method described in Examples later.

The space filling material according to the present invention can have various densities depending on a space to be filled and an intended use, and may have a density of 0.5 to 10 g/cm$^3$, preferably 0.6 to 8 g/cm$^3$, more preferably 0.7 to 5 g/cm$^3$. The density of the space filling material is a value measured by the method described in Examples later.

The shape of the space filling material according to the present invention is not limited to a plate shape, and may be various shapes depending on a space to be filled and an intended use. The shape may include a steric shape having a three-dimensional structure. In the case of a steric shape, the direction of thermal expansion is regarded as the thickness direction.

The space filling material according to the present invention preferably has an expansion ratio of 105% or more, preferably 120% or more, more preferably 140% or more, still more preferably 150% or more, still more preferably 170% or more, at a constant load in the thickness direction. The upper limit of the expansion ratio at a constant load in the thickness direction is not particularly limited, and may be 500%. The expansion ratio in the above range at a constant load in the thickness direction may enable to enhance strength for reinforcement and/or fixing in a satisfactory way. It should be noted that the expansion ratio of the space filling material at a constant load in the thickness direction is a value measured by the method described in Examples later.

From the viewpoint of concentrating the expansion stress during heating in the thickness direction, the space filling material after expanded may preferably have a deformation ratio of −10% to 10% in a direction perpendicular to the thickness direction, due to expansion or contraction in the perpendicular direction. The deformation ratio in a direction perpendicular to the thickness direction indicates contraction when it is negative and expansion when it is positive. The deformation ratio in a direction perpendicular to the thickness direction may be more preferably −8% to 8%, still more preferably −5% to 5%. For example, the space filling material according to the present invention may preferably contain the reinforcing fibers oriented in the plane direction so as to reduce a deformation ratio in a direction perpendicular to the thickness direction to a smaller ratio in terms of expansion as well as contraction. It should be noted that deformation ratio of the space filling material in a direction perpendicular to the thickness direction is a value measured by the method described in Examples later.

From the viewpoint of suppressing gas generation, it is preferred that the space filling material according to the present invention may substantially exclude volatile substances that volatilize when heated (for example, low molecular weight compounds having a boiling point lower than the heating temperature), foaming agents, expandable graphite, and the like.

Method of Using Space Filling Material

The method of using the space filling material according to the present invention may include heating the space filling material at a temperature of softening temperature of a resin or higher so as to expand the space filling material in a predetermined space.

Figure 1B:
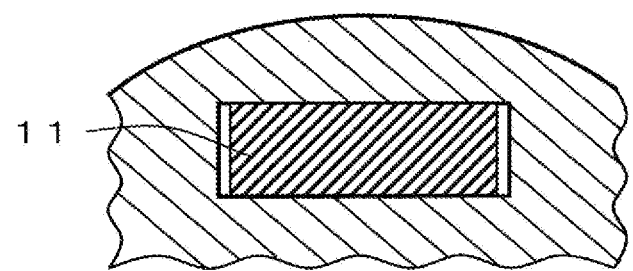
FIG. 1B is a schematic sectional view for illustrating the method of using the space filling material according to the first embodiment of the present invention, in which the space filling material is in a state after expansion.

For example, a method of using a space filling material will be described with reference to FIGS. 1A and 1B showing a schematic sectional view according to a first embodiment of the present invention. FIG. 1A shows the state of the space filling material 11 before expansion, and FIG. 1B shows the state of the space filling material 11 after expansion. In FIG. 1A, the space filling material 11 is inserted into a space 13 enclosed by an external member 12. In FIG. 1A, the space 13 is formed by being entirely enclosed by a single external member 12, but the space 13 does not have to be a closed space completely enclosed by the external member. The space 13 may be formed by, for example, a U-shape in which an open space may be partially formed. Further, the space may be formed by a plurality of external members in a different manner. Further, a plurality of space filling materials 11 may be inserted into the space 13. It should be noted that FIG. 1A shows a part of the external member 12.

By heating the space filling material 11 at a temperature equal to or higher than the softening temperature of the resin constituting the space filling material 11, the resin comes to be softened, and then bending loads of the reinforcing fibers restrained by the resin are released, whereby the repulsive force (restoring force) of the reinforcing fibers generates in the thickness direction. Thereafter the space filling material 11 irreversibly expands in the thickness direction (X direction in FIG. 1A) and fills the space 13 as shown in FIG. 1B. Expansion stress of the space filling material 11 causes a pressing force applied to a wall surface of the space 13. Since the pressing force is high enough, the external member 12 is sufficiently reinforced.

The heating temperature may be, for example, a temperature of (softening temperature+10)° C. or higher, preferably (softening temperature+20)° C. or higher, and more preferably (softening temperature+30)° C. or higher in expansion. The upper limit of the heating temperature may be a temperature of (softening temperature+200)° C. or lower.

Further, the method of using the space filling material according to the present invention may include inserting a space filling material into a predetermined space prior to being subjected the space filling material to be expanded.

In the present invention, the space filling material after expansion (after filling) may have a porosity of 30 to 95%. Where the expanded space filling material has a porosity in this range, liquid as well as gas can be sufficiently passed through the expanded space filling material. For example, where a structure including the expanded space filling material is in need to be cooled, the structure can be cooled by passing a cooling liquid through the filled space filling material. The space filling material after expansion may have a porosity of preferably 35 to 90%, more preferably 40 to 85%, and even more preferably 45 to 80%. It should be noted that the porosity of the space filling material after expansion is a value measured by the method described in Examples later.

According to the present invention, the space filling material after expansion (after filling) may have a continuous porous structure. The continuous pores (voids) in the expanded space filling material enables liquid and gas to be sufficiently passed through the expanded space filling material.

According to the present invention, from the viewpoint of improving mechanical strength of the space filling material after expansion (after filling), the space filling material after expansion (after filling) may have a density of 0.1 to 1.5 g/cm$^3$, preferably 0.2 to 1.4 g/cm$^3$, and more preferably 0.3 to 1.3 g/cm$^3$.

According to the present invention, from the viewpoint of improving mechanical strength and liquid permeability (penetration property) of the space filling material after expansion (after filling), the space filling material after expansion (after filling) may have an expansion ratio of 120% to 300%, preferably 130% to 280%, more preferably 140% to 250% after filling in the thickness direction. The expansion ratio in the thickness direction is expressed by the following formula.

Expansion ratio after filling (%)=thickness of space filling material after filling (thickness of space to be filled) (mm)/thickness of space filling material before filling (mm)×100

According to the present invention, the space filling material can achieve a desired size by use of expansion, and a predetermined space to be filled with the space filling material may have a thickness (a thickness of the space filling material after expansion (after filling)) selected from a wide range of, for example 0.2 to 600 mm. The thickness of the predetermined space to be filled may be, for example, 0.2 to 50 mm, preferably 0.5 to 30 mm, and more preferably 1 to 20 mm.

Further, the method of using the space filling material according to the present invention may include heating the space filling material at a temperature of softening temperature of the resin or higher so as to expand the space filling material(s) in the predetermined space and fix the material to be fixed. Accordingly, the space filling material according to the present invention may be used as a fixing material for fixing a material to be fixed.

Figure 2A:
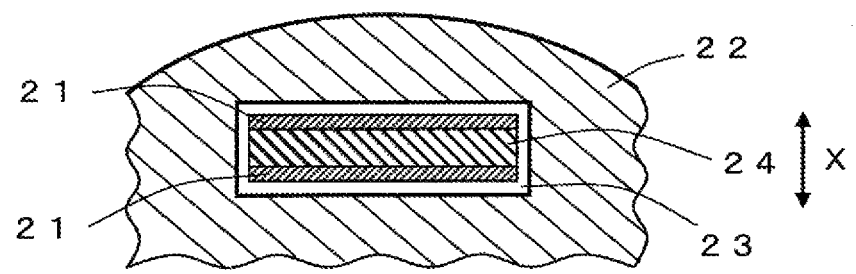
FIG. 2A is a schematic sectional view for illustrating a method of using space filling materials according to a second embodiment of the present invention, in which the space filling materials are in a state before expansion.
Figure 2B:
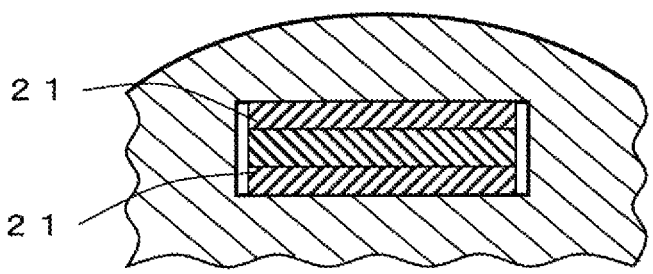
FIG. 2B is a schematic sectional view for illustrating the method of using the space filling materials according to the second embodiment of the present invention, in which the space filling materials are in a state after expansion.

For example, a method of using a space filling material will be described with reference to FIGS. 2A and 2B showing a schematic sectional view according to a second embodiment of the present invention. FIG. 2A shows the state of space filling materials 21 before expansion, and FIG. 2B shows the state of space filling materials 21 after expansion. In FIG. 2A, the two space filling materials 21 and a material 24 to be fixed are inserted into a space 23 enclosed by an external member 22 where the material 24 to be fixed is sandwiched between the space filling materials 21. In FIG. 2A, the space 23 is formed by being entirely enclosed by a single external member 22, but the space 23 does not have to be a closed space completely enclosed by the external member. The space 23 may be formed by, for example, a U-shape external member 22 in which an open space may be partially formed. Further, the space may be formed by a plurality of external members in a different manner. Further, the space may be formed by a plurality of different members. Further, in the figure, the space filling materials 21 may be laminated one by one on both sides of a material 24 to be fixed, but the number of laminated space filling materials as well as the insertion location are not limited, and one or more of the space filling materials 21 are laminated on at least one surface of the material 24 to be fixed. A plurality of space filling materials may be laminated to be inserted. The space filling materials 21 laminated on both sides of the material 24 to be fixed may be the same or different. From the viewpoint of enhancing uniform expandability, space filling materials may be preferably the same with each other. It should be noted that FIG. 2A shows a part of the external member 22.

By heating the space filling materials 21 at a temperature equal to or higher than the softening temperature of the resin constituting the space filling materials 21, the resin comes to be softened, and then bending loads of the reinforcing fibers restrained by the resin are released, whereby the repulsive force (restoring force) of the reinforcing fibers generates in the thickness direction of each of the space filling materials. Thereafter the space filling materials 21 irreversibly expands in the thickness direction (X direction in FIG. 2A) and fills the space 23 with the material 24 to be fixed as shown in FIG. 2B. Expansion stress of the space filling materials 21 cause a pressing force applied to a wall surface of the space 23 and to both surfaces of the material 24 to be fixed. Since the pressing force is high enough, the material 24 to be fixed is sufficiently fixed.

Further, the method of using the space filling material according to the present invention may include inserting the space filling material and/or the material to be fixed into a predetermined space prior to being subjected the space filling material to be expanded and fix the material to be fixed. The space filling material and the material to be fixed may be inserted together. Alternatively, one of the space filling material and the material to be fixed may be inserted first, and then the other may be inserted. Further, one of the space filling material and the material to be fixed may be inserted into a predetermined space, and the other may be inserted into the space in which one is already inserted.

Where the space filling material according to the present invention is used as a fixing material, a punching load described in Examples later to push a fixed material may be 25 N or more, preferably 100 N or more, and more preferably 200 N or more. The upper limit of the punching load of the fixed material is not particularly limited, and may be, for example, about 2000 N. It should be noted that the punching load is a value measured by the method described in Examples later.

Space Filling Structure

The space filling structure according to the present invention may include a space filling material(s) and a material(s) to be fixed, the material(s) being integrated in contact with at least a part of the space filling material. The space filling structure in which a space filling material and a material to be fixed are laminated can be obtained, for example, by stacking the space filling material and a material to be fixed in contact with each other, heating the stacked material at a temperature equal to or higher than the softening temperature of the resin in the space filling material while pressurizing in the stacking direction, and then cooling them while pressing so as to laminate the space filling material and the material to be fixed. Further, the space filling structure can be obtained, for example, by adhering the space filling material to a material to be fixed via an adhesive. In this case, the adhesive is not particularly limited as long as it can adhere the space filling material to the material to be fixed, and a conventional adhesive can be used.

In the space filling structure according to the present invention, the material to be fixed may be sandwiched between the space filling materials. In the space filling structure, the material to be fixed may be sandwiched by the space filling materials in at least two opposite directions, for example, may be sandwiched in the thickness direction of the material to be fixed. Alternatively, the material to be fixed may be surrounded or attached by the space filling materials in the thickness direction of the material to be fixed and a direction perpendicular to the thickness direction, respectively.

Method of Using Space Filling Structure

The method of using the space filling structure according to the present invention may include heating the space filling structure at a temperature of softening temperature of the resin or higher so as to expand the space filling material in a predetermined space and fix the material to be fixed.

Further, the method of using the space filling structure according to the present invention may include inserting the space filling structure into a predetermined space prior to being subjected the space filling material to be expanded and fix the material to be fixed.

Further, the space filling material according to the present invention may be advantageously used in transportation means, home appliances, industrial machines, buildings, or the like as a space filling material for reinforcing a member(s) by filling a predetermined space enclosed by the member(s) or for fixing a material to be fixed by fixing the material to be fixed in a predetermined space enclosed by a member(s).

In particular, where the space filling material has desired insulating properties and/or heat resistance, an embodiment of the space filling material according to the present invention can be advantageously used as an insulating and/or heat resistant space filling material.

For example, the space filling material and the space filling structure according to the present invention can be used as a molding material for fixing permanent magnets (materials to be fixed) in a plurality of holes formed in a rotor in a motor (for example, a motor for driving an automobile). In such a case, permanent magnets can be fixed with a satisfactory fixing strength. Further, by means of continuous pores in the expanded space filling materials, the motor can be cooled by passing a cooling liquid through the pores. Furthermore, the expanded space filling materials enable to exert insulation and heat resistance. Further, despite having pores, the expanded space filling material has satisfactory fixing strength so that it is possible to reduce an amount of materials to be used in the space, resulting in saving cost.

EXAMPLES

Hereinafter, the present invention will be described in more detail with reference to the Examples. However, the present invention will not be limited by the Examples whatsoever. In the Examples and Comparative Examples below, various physical properties were determined in the following manner.

Single Fiber Fineness

The single fiber fineness of fibers was determined in reference to Method B of 8.5.1 under JIS L 1015:2010 "Test methods for man-made staple fibers" from an average fiber length calculated by the below-mentioned method.

Average Fiber Length

The fiber lengths of 100 randomly selected fibers were measured, and the average value of the measured 100 values was taken as the average fiber length.

Average Fiber Diameter

The fiber diameters of 30 randomly selected fibers were measured by microscopic observation, and the average value of the measured 30 values was taken as the average fiber diameter.

Tensile Elastic Modulus

The tensile elastic modulus was measured in accordance with JIS R 3420 for glass fibers and JIS R 7606 for carbon fibers.

Glass Transition Temperature of Thermoplastic Fibers

The glass transition temperature (Tg) of thermoplastic fibers was determined by measuring a temperature dependence of loss tangent (tan S) at an elevating temperature rate of 10° C./min at a frequency of 10 Hz using a solid dynamic viscoelasticity analyzer "Rheospectra DVE-V4" manufactured by Rheology Co., Ltd., and defining as a temperature at a peak value of tan S. Here, the temperature at the peak value of tan δ means a temperature at which primary differential value of the tan δ values relative to the temperature values is zero.

Volume Ratio

The volume ratio of reinforcing fibers and a resin constituting a space filling material was calculated by converting weight ratios of the reinforcing fibers and the resin by means of the specific gravities, respectively.

Basis Weight

A space filling material sample was cut into 10 cm by 10 cm, followed by measuring a weight (g) thereof. The basis weight was calculated from the weight in accordance with the following formula.

Basis Weight $(g/m^2)$=Weight $(g)/0.01$ $(m^2)$

Thickness

The thicknesses of a space filling material sample were measured at points in total, that is, the central point, and the points 1 cm inside each of the corners (4 points). The average value of the measured 5 values was taken as the thickness of the space filling material.

Density

A space filling material sample was cut into 10 cm by 10 cm, followed by measuring a thickness (cm) and a weight (g) thereof. The density was calculated from the values of the thickness and the weight in accordance with the following formula.

Density $(g/cm^3)$=Weight $(g)/$(Thickness $(cm) \times 100$ $(cm^2))$

Porosity

The porosity (%) of a space filling material was determined in accordance with JIS K 7075 "Fiber content and porosity test of carbon fiber reinforced plastic".

Expansion Ratio at Constant Load

A space filling material before expansion was cut out into 5 cm by 5 cm to be used as a test sample. A metal rectangular cuboid with a weight of 1.44 kg, a length of 5 cm, a width of 5 cm, and a height of 7.4 cm was placed onto the test sample. In such a state, the test sample was placed in a hot air furnace, and heated at a temperature at least 30° C. higher relative to the softening temperature of the resin, i.e., (the softening temperature+30)$^1$C or higher. Heating was continued until change in thickness of the space filling material becomes undeterminable.

Thereafter, the thickness of the heated space filling material sample was measured as the thickness of space filling material after expansion, and the expansion ratio at a constant load (5.6 kPa) was calculated from the thickness of the space filling material after expansion and the thickness before expansion in accordance with the following formula.

Expansion Ratio (%)=Thickness of Space Filling Material After Expansion (mm)/Thickness of Space Filling Material Before Expansion (mm)× 100

Deformation Ratio in Direction Perpendicular to Thickness Direction

The expanded test sample used for determining the expansion ratio at a constant load (5.6 kPa) was used for measuring the dimension in the plane direction. The measured values were calculated in accordance with the following formula to give a deformation ratio.

Deformation Ratio (%)=(Area After Expansion $(cm^2)$–Area Before Expansion $(cm^2)$)/Area Before Expansion $(cm^2) \times 100$

Evaluation of Filling Property

S (Sufficient): Space to be filled is filled from bottom to top.

P (Poor): Space to be filled is not filled from bottom to top.

The expansion ratio after filling was calculated in accordance with the following formula. It should be noted that where the space to be filled is filled from bottom to top with the expanded space filling material (i.e., space filling material after filling), the thickness of the space filling material after filling reaches 3 mm.

Expansion Ratio After Filling (%)=Thickness of Space Filling Material After Filling (mm)/Thickness of Space Filling Material Before Filling (mm)×100.

The porosity of the space filling material after filling was calculated in the same manner as with the above-mentioned porosity of the space filling material.

The density of the space filling material after filling was calculated in accordance with the following formula.

Density After Filling $(g/cm^3)$=Density of Space Filling Material Before Filling $(g/cm^3)/$(Expansion Ratio After Filling (%)/100).

Push Out Load

A steel with a cuboid shape having a thickness of 4 mm, a width of 14 mm, and a length of 50 mm was used as a material to be fixed, and inserted into a hole of an external member made of steel, the hole having a height of 10 mm, a width of 20 mm, and a depth of 50 mm. Two sheets of space filling materials each cut out into 14 mm by 50 mm were further inserted one by one between the external member and the material to be fixed. Such prepared materials/member were heated in a hot air furnace at a predetermined temperature for 30 minutes, and thereby the material to be fixed was fixed to the external member by means of the space filling materials.

The obtained multi-layered structure (the structure where the material to be fixed was fixed inside the external member by means of the space filling materials) was subjected to a push out test, in which only the material to be fixed was subjected to an increasing load using a universal testing machine ("AG-2000A" manufactured by Shimadzu Corporation) in the length direction of the material to be fixed so as to push out the material to be fixed. In this process, the load at which the space filling materials began to slide relative to the external member was taken as the push out load.

Evaluation of Liquid Permeability

Three sheets of space filling materials each cut out into 50 mm by 50 mm were overlaid and inserted into the through hole of an external member made of steel, the through hole having a height of 9 mm, a width of 50 mm, a depth of 50 mm. After inserting the overlaid material, the materials/member were subjected to heating at a predetermined temperature so as to make the space filling materials expanded into the through hole of the external member in which the through hole was completely filled with the space filling materials. Thereafter, pressure-resistant tubes were attached to opposite ends of the external member so as to allow a liquid to pass through the through hole of the external member.

Then, pure water was injected from one of the pressure-resistant tubes at a pressure of 45 kPa, and the volume of water flowed out from the other pressure-resistant tube through the space filling material was observed. As such, the time t (min) required for the total amount of flowing water from 20 mL to 40 mL was measured.

From the measurement result, the liquid flow rate of the expanded space filling material was calculated in accordance with the following formula.

Liquid flow rate (mL/min)=20 (mL)/$t$ (min)

Liquid permeability was evaluated according to the following criteria with respect to the obtained liquid flow rate of the space filling material.

E (Excellent): 100 mm/min or higher
S (Sufficient): 3 mm/min or higher and lower than 100 mm/min
P (Poor): lower than 3 mm/min Evaluation of Insulation The volume resistivity of a space filling material obtained in each of the Examples was measured in accordance with JIS K 6911, and the insulation was evaluated according to the following criteria.

S (Sufficient): the volume resistivity was 10 (Ω·cm) or higher
P (Poor): the volume resistivity was less than 105 (Ω·cm)

Evaluation of Heat Resistance

The space filling material obtained in each of the Examples was heated at a predetermined temperature for 10 minutes using a test press machine ("KVHC-II" manufactured by KITAGAWA SEIK Co., Ltd.) with a gap set to a gap thickness of 3 mm so as to be expanded within the gap. After expansion, the space filling material was cooled so as to prepare a heat resistance test piece. Next, in accordance with JIS K 7017 "Fiber-reinforced plastics composites-determination of flexural properties", flexural test pieces were prepared from the heat resistance test piece so as to perform flexural tests in atmospheres of 25° C. and 80° C., respectively, and the physical property retention ratio was calculated by the following formula.

Property Retention Ratio (%)=Flexural Strength (MPa) in Atmosphere of 80° C./Flexural Strength (MPa) in Atmosphere of 25° C.×100

Heat resistance of the test sample was evaluated according to the following criteria.

S (Sufficient): physical property retention ratio of at least 70%
P (Poor): physical property retention ratio of less than 70%

Reference Example 1 (Production of Polyetherimide Fiber)

An amorphous polyetherimide-based polymer (hereinafter, sometimes abbreviated as PEI-based polymer) ("ULTEM9001" manufactured by SABIC Innovative Plastics) was subjected to drying under vacuum for 12 hours at 150° C. The PEI-based polymer was discharged from round hole nozzles under the conditions of a spinning head temperature of 390° C., a spinning speed of 1500 m/min, and a discharge rate of 50 g/min so as to prepare a multifilament (2640 dtex/1200f) of PEI fibers. The obtained multifilament was cut to 15 mm to prepare shortcut PEI fibers. The appearance of such-obtained fibers was good without formation of fluff. The fibers had a single fiber fineness of 2.2 dtex, an average fiber length of 15.0 mm, a glass transition temperature (Tg) of 217° C., and a specific gravity of 1.27 g/cm$^3$.

Reference Example 2 (Production of Semi-Aromatic Polyamide Fiber)

A semi-aromatic polyamide-based polymer ("Genestar PA9T" manufactured by KURARAY CO., LTD., hereinafter sometimes abbreviated as PA9T; melting point: 265° C.) was subjected to drying under vacuum for 12 hours at 80° C. The polymer was discharged from round hole nozzles under the conditions of a spinning head temperature of 310° C., a spinning speed of 1500 m/min, and a discharge rate of 50 g/min so as to prepare a multifilament (2640 dtex/1200f) of PA9T fibers. The obtained multifilament was cut to 15 mm to prepare shortcut PA9T fibers. The appearance of such-obtained fibers was good without formation of fluff. The fibers had a single fiber fineness of 2.2 dtex, an average fiber length of 15.1 mm, a glass transition temperature of 125° C., and a specific gravity of 1.14 g/cm$^3$.

Reference Example 3 (Production of Aliphatic Polyamide Fiber)

A polyamide 6-based polymer ("UBE NYLON 1015B" manufactured by UBE INDUSTRIES, LTD., hereinafter sometimes abbreviated as PA6; melting point: 225° C.) was subjected to drying under vacuum for 12 hours at 80° C. The polymer was discharged from round hole nozzles under the conditions of a spinning head temperature of 290° C., a spinning speed of 3000 m/min, and a discharge rate of 50 g/min so as to prepare a multifilament (2640 dtex/1200f) of PA6 fibers. The obtained multifilament was cut to 15 mm to prepare shortcut PA6 fibers. The appearance of such-obtained fibers was good without formation of fluff. The fibers had a single fiber fineness of 2.2 dtex, an average fiber length of 15.0 mm, a glass transition temperature of 50° C., and a specific gravity of 1.14 g/cm$^3$.

Reference Example 4 (Polycarbonate Fiber)

An amorphous polycarbonate (hereinafter sometimes abbreviated as PC)-based polymer ("Iupilon S-3000" manufactured by Mitsubishi Engineering-Plastics Corporation) was subjected to drying under vacuum for 6 hours at 120° C. The PC-based polymer was discharged from round hole nozzles under the conditions of a spinning head temperature of 300° C., a spinning speed of 1500 m/min, and a discharge rate of 50 g/min so as to prepare a multifilament (2640 dtex/1200f) of PC fibers. The obtained multifilament was cut to 15 mm to prepare shortcut PC fibers. The appearance of such-obtained fibers was good without formation of fluff. The fibers had a single fiber fineness of 2.2 dtex, an average fiber length of 15.0 mm, a glass transition temperature of 150° C., and a specific gravity of 1.20 g/cm$^3$.

Example 1

From a slurry containing: 50 wt % of PEI fibers as thermoplastic fibers; and 50 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 254 g/m$^2$ by a wet laid process.

Eight sheets of the obtained mixed nonwoven fabrics were overlaid, and the overlaid material was heated at 340° C. for 10 minutes while pressurizing at 3 MPa toward a surface perpendicular to the overlaying direction by disposing a spacer with a height of 1.5 mm using a test press machine ("KVHC-II" manufactured by KITAGAWA SEIKI Co., Ltd.). In such a manner, the PEI fibers were molten into a PEI resin that was impregnated between the glass fibers. After impregnation, while pressurizing, the overlaid material was cooled down to 200° C., the temperature equal to or lower than the glass transition temperature of PEI to obtain a space filling material. Thus-obtained space filling material had a thickness of 1.55 mm, a basis weight of 1936 g/m$^2$, a density of 1.248 g/cm$^3$, and a porosity of 26.3%. The space filling material had an expansion ratio of 231% at a constant load, and a deformation ratio of −0.2% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects while heating temperature for expansion was set to 360° C. The evaluation results are shown in Table. 1.

Example 2

Except that four sheets of overlaid mixed nonwoven fabrics were used in the producing process of the space filling material, a space filling material was produced in the same manner as in Example 1. Thus-obtained space filling material had a thickness of 1.36 mm, a basis weight of 963 g/m$^2$, a density of 0.709 g/cm$^3$, and a porosity of 58.1%. The space filling material had an expansion ratio of 141% at a constant load, and a deformation ratio of −0.2% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 3

Except that twelve sheets of overlaid mixed nonwoven fabrics were used and the height of the spacer was changed to 2.2 mm in the producing process of the space filling material, a space filling material was produced in the same manner as in Example 1. Thus-obtained space filling material had a thickness of 2.15 mm, a basis weight of 2918 g/cm$^3$, a density of 1.360 g/cm$^3$, and a porosity of 19.7%. The space filling material had an expansion ratio of 237% at a constant load, and a deformation ratio of −0.2% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 4

From a slurry containing: 70 wt % of PEI fibers as thermoplastic fibers; and 30 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 224 g/m$^2$ by a wet laid process.

Then, a space filling material was prepared in the same manner as in Example 1. Thus-obtained space filling material had a thickness of 1.42 mm, a basis weight of 1698 g/m$^2$, a density of 1.197 g/cm$^3$, and a porosity of 19.9%. The space filling material had an expansion ratio of 153% at a constant load, and a deformation ratio of −0.3% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 5

From a slurry containing 30 wt % of PEI fibers as thermoplastic fibers; and 70 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 293 g/m$^2$ by a wet laid process.

Then, a space filling material was prepared in the same manner as in Example 1. Thus-obtained space filling material had a thickness of 1.80 mm, a basis weight of 2218 g/m$^2$, a density of 1.232 g/cm$^3$, and a porosity of 36.9%. The space filling material had an expansion ratio of 269% at a constant load, and a deformation ratio of −0.1% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 6

From a slurry containing 50 wt % of PA9T fibers as thermoplastic fibers; and 50 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 236 g/m$^2$ by a wet laid process.

Eight sheets of the obtained mixed nonwoven fabrics were overlaid, and the overlaid material was heated at 320° C. for 10 minutes while pressurizing at 3 MPa toward a surface perpendicular to the overlaid direction by disposing a spacer with a height of 1.5 mm using a test press machine ("KVHC-II" manufactured by KITAGAWA SEIKI Co., Ltd.). In such a manner, the PA9T fibers were molten into a PA9T resin that was impregnated between the glass fibers.

After impregnation, while pressurizing, the overlaid material was cooled down to 100° C., the temperature equal to or lower than the glass transition temperature of PA9T to obtain a space filling material. Thus-obtained space filling material had a thickness of 1.47 mm, a basis weight of 1813 g/m², a density of 1.232 g/cm³, and a porosity of 21.7%. The space filling material had an expansion ratio of 208% at a constant load, and a deformation ratio of −0.2% in a direction perpendicular to the thickness direction. Furthermore, a plurality of intersections was formed between the glass fibers in the space filling material, and at least one of the intersections was bonded with the PA9T resin.

The obtained space filling material was evaluated from a variety of aspects while heating temperature for expansion was set to 340° C. The evaluation results are shown in Table 1.

Example 7

From a slurry containing 50 wt % of PEI fibers as thermoplastic fibers; and 50 wt % of carbon fibers (available from TOHO TENAX CO., LTD., average fiber diameter: 7 μm, specific gravity: 1.82 g/cm³) having a cut length of 13 mm as reinforcing fibers, was obtained a mixed nonwoven fabric (mixed paper) having a basis weight of 224 g/m² by a wet laid process.

Eight sheets of the obtained mixed nonwoven fabrics were overlaid, and the overlaid material was heated at 340° C. for 10 minutes while pressurizing at 3 MPa toward a surface perpendicular to the overlaid direction by disposing a spacer with a height of 1.5 mm using a test press machine ("KVHC-II" manufactured by KITAGAWA SEIKI Co., LTD.). In such a manner, the PEI fibers were molten into a PEI resin that was impregnated between the carbon fibers. After impregnation, while pressurizing, the overlaid material was cooled down to 200° C., the temperature equal to or lower than the glass transition temperature of PEI to obtain a space filling material. Thus-obtained space filling material had a thickness of 1.99 mm, a basis weight of 1696 g/m², a density of 0.853 g/cm³, and a porosity of 43.0%. The space filling material had an expansion ratio of 299% at a constant load, and a deformation ratio of −0.2% in a direction perpendicular to the thickness direction. Furthermore, a plurality of intersections was formed between the carbon fibers in the space filling material, and at least one of the intersections was bonded with the PEI resin.

The obtained space filling material was evaluated from a variety of aspects in the same manner as in Example 1. The evaluation results are shown in Table 1.

Example 8

From a slurry containing: 10 wt % of PEI fibers as thermoplastic fibers; and 90 wt % of glass fibers (available from Nitto Boseki Co., Ltd., average fiber diameter: 9 μm, specific gravity: 2.54 g/cm³) having a cut length of 13 mm as reinforcing fibers, was obtained a mixed nonwoven fabric (mixed paper) having a basis weight of 346 g/m² by a wet laid process.

Then, a space filling material was prepared in the same manner as in Example 1 except that pressurizing force while pressurizing was changed to 15 MPa. Thus-obtained space filling material had a thickness of 1.86 mm, a basis weight of 2583 g/m², a density of 1.390 g/cm³, and a porosity of 39.8%. The space filling material had an expansion ratio of 143% at a constant load, and a deformation ratio of −0.1% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 9

From a slurry containing: 50 wt % of PA6 fibers as thermoplastic fibers; and 50 wt % of glass fibers (available from Nitto Boseki Co., Ltd., average fiber diameter: 9 μm, specific gravity: 2.54 g/cm³) having a cut length of 13 mm as reinforcing fibers, was obtained a mixed nonwoven fabric (mixed paper) having a basis weight of 234 g/m² by a wet laid process.

Eight sheets of the obtained mixed nonwoven fabrics were overlaid, and the overlaid material was heated at 300° C. for 10 minutes while pressurizing at 3 MPa toward a surface perpendicular to the overlaid direction by disposing a spacer with a height of 1.5 mm using a test press machine ("KVHC-II" manufactured by KITAGAWA SEIKI Co., LTD.). In such a manner, the PA6 fibers were molten into a PA6 resin that was impregnated between the glass fibers. After impregnation, while pressurizing, the overlaid material was cooled down to 30° C., the temperature equal to or lower than the glass transition temperature of PA6 to obtain a space filling material. Thus-obtained space filling material had a thickness of 1.40 mm, a basis weight of 1800 g/m², a density of 1.286 g/cm³, and a porosity of 18.3%. The space filling material had an expansion ratio of 204% at a constant load, and a deformation ratio of −0.2% in a direction perpendicular to the thickness direction. Furthermore, a plurality of intersections was formed between the glass fibers in the space filling material, and at least one of the intersections was bonded with the PA6 resin.

The obtained space filling material was evaluated from a variety of aspects. The evaluation results are shown in Table 1.

The obtained space filling material was evaluated from a variety of aspects while heating temperature for expansion was set to 300° C. The evaluation results are shown in Table 1.

Example 10

From a slurry containing: 80 wt % of PEI fibers as thermoplastic fibers; and 20 wt % of glass fibers (available from Nitto Boseki Co., Ltd., average fiber diameter: 9 μm, specific gravity: 2.54 g/cm³) having a cut length of 13 mm as reinforcing fibers, was obtained a mixed nonwoven fabric (mixed paper) having a basis weight of 230 g/m² by a wet laid process.

Except that twelve sheets of the mixed nonwoven fabrics were overlaid and that the height of the spacer was changed to 2.2 mm, a space filling material was produced in the same manner as in Example 1. Thus-obtained space filling material had a thickness of 2.00 mm, a basis weight of 2688 g/m³, a density of 1.340 g/cm³, and a porosity of 5.0%. The space filling material had an expansion ratio of 125% at a constant load, and a deformation ratio of −0.3% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 11

From a slurry containing: 85 wt % of PEI fibers as thermoplastic fibers; and 15 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 220 g/m$^2$ by a wet laid process.

Except that twelve sheets of the mixed nonwoven fabrics were overlaid and that the height of the spacer was changed to 2.2 mm, a space filling material was produced in the same manner as in Example 1. Thus-obtained space filling material had a thickness of 2.00 mm, a basis weight of 2573 g/m$^3$, a density of 1.289 g/cm$^3$, and a porosity of 6.1%. The space filling material had an expansion ratio of 108% at a constant load, and a deformation ratio of −0.3% in a direction perpendicular to the thickness direction. Furthermore, a plurality of intersections was formed between the glass fibers in the space filling material, and at least one of the intersections was bonded with the PEI resin.

The obtained space filling material was evaluated from a variety of aspects in the same manner as in Example 1. The evaluation results are shown in Table 1.

Example 12

From a slurry containing: 49 wt % of PC fibers as thermoplastic fibers; and 51 wt % of glass fibers (available from Nitto Boseki Co., Ltd., average fiber diameter: 9 μm, specific gravity: 2.54 g/cm$^3$) having a cut length of 13 mm as reinforcing fibers, was obtained a mixed nonwoven fabric (mixed paper) having a basis weight of 150 g/m$^2$ by a wet laid process.

Twelve sheets of the obtained mixed nonwoven fabrics were overlaid, and the overlaid material was heated at 280° C. for 10 minutes while pressurizing at 3 MPa toward a surface perpendicular to the overlaid direction by disposing a spacer with a height of 1.5 mm using a test press machine ("KVHC-II" manufactured by KITAGAWA SEIKI Co., LTD.). In such a manner, the PC fibers were molten into a PC resin that was impregnated between the glass fibers. After impregnation, while pressurizing, the overlaid material was cooled down to 130° C., the temperature equal to or lower than the glass transition temperature of PC to obtain a space filling material. Thus-obtained space filling material had a thickness of 1.53 mm, a basis weight of 1800 g/m$^2$, a density of 1.176 g/cm$^3$, and a porosity of 28.3%. The space filling material had an expansion ratio of 251% at a constant load, and a deformation ratio of −0.1% in a direction perpendicular to the thickness direction. Furthermore, a plurality of intersections was formed between the glass fibers in the space filling material, and at least one of the intersections was bonded with the PC resin.

The obtained space filling material was evaluated from a variety of aspects in the same manner as in Example 1. The evaluation results are shown in Table 1.

Comparative Example 1

From a slurry containing 100 wt % of PEI fibers as thermoplastic fibers, was obtained a nonwoven fabric having a basis weight of 210 g/m$^2$ by a wet laid process.

Except that twelve sheets of the nonwoven fabrics were overlaid, a space filling material was produced in the same manner as in Example 1. Thus-obtained space filling material had a thickness of 2.00 mm, a basis weight of 2410 g/m$^3$, a density of 1.210 g/cm$^3$, and a porosity of 5.0%. When the thus-obtained space filling material was subjected to heating under the same conditions as in Example 1 in order to evaluate the expansion ratio at a constant load, the space filling material melted and flowed out, so that it did not function as a "space filling material".

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Reinfocing fiber | Type | GF | GF | GF | GF | GF | GF | CF |
| | Tensile elastic modulus (GPa) | 73 | 73 | 73 | 73 | 73 | 73 | 240 |
| | Ratio (wt %) | 50 | 50 | 50 | 30 | 70 | 50 | 50 |
| | Ratio (vol %) | 33.3 | 33.3 | 33.3 | 17.6 | 53.8 | 31.0 | 41.1 |
| | Fiber length (mm) | 13 | 13 | 13 | 13 | 13 | 13 | 13 |
| Resin | Type | PEI | PEI | PEI | PEI | PEI | PA9T | PEI |
| | Ratio (wt %) | 50 | 50 | 50 | 70 | 30 | 50 | 50 |
| | Ratio (vol %) | 66.7 | 66.7 | 66.7 | 82.4 | 46.2 | 69.0 | 58.9 |
| | Tg (° C.) | 217 | 217 | 217 | 217 | 217 | 125 | 217 |
| Space filling material configuration | Basis weight (g/m$^2$) | 1936 | 963 | 2918 | 1698 | 2218 | 1813 | 1696 |
| | Thickness (mm) | 1.55 | 1.36 | 2.15 | 1.42 | 1.80 | 1.47 | 1.99 |
| | Density (g/cm$^3$) | 1.248 | 0.709 | 1.360 | 1.197 | 1.232 | 1.232 | 0.853 |
| | Porosity (%) | 26.3 | 58.1 | 19.7 | 19.9 | 36.9 | 21.7 | 43.0 |
| Physical property of space filling material | Expansion ratio at a constant load (%) | 231 | 141 | 237 | 153 | 269 | 208 | 299 |
| | Deformation ratio (%) | −0.2 | −0.2 | −0.2 | −0.3 | −0.1 | −0.2 | −0.2 |
| Filling property eval. | Filling property | S | S | S | S | S | S | S |
| | Expansion ratio after filling (%) | 193 | 221 | 140 | 211 | 167 | 204 | 151 |
| | Porosity after filling (%) | 61.9 | 81.0 | 42.5 | 62.1 | 62.2 | 61.6 | 62.2 |
| | Density after filling (g/cm$^3$) | 0.647 | 0.321 | 0.971 | 0.567 | 0.738 | 0.604 | 0.565 |
| Fixity eval. | Push out load (N) | 875 | 242 | 890 | 350 | 796 | 701 | 503 |
| Liquid permeability eval. (Aces.) | | E | E | S | E | E | E | E |
| Liquid permeability eval. (mL/min) | | 255 | 365 | 7 | 270 | 235 | 250 | 220 |
| Insulation eval. (M) | | S | S | S | S | S | S | P |
| Heat resistance eval. (M) | | S | S | S | S | S | S | S |

TABLE 1-continued

|  |  | Ex. 8 | Ex. 9 | Ex. 10 | Ex. 11 | Ex. 12 | Com. Ex. 1 |
|---|---|---|---|---|---|---|---|
| Reinforcing fiber | Type | GF | GF | GF | GF | GF | — |
|  | Tensile elastic modulus (GPa) | 73 | 73 | 73 | 73 | 73 | — |
|  | Ratio (wt %) | 90 | 50 | 20 | 15 | 51 | — |
|  | Ratio (vol %) | 81.8 | 31.0 | 11.1 | 8.1 | 33.0 | — |
|  | Fiber length (mm) | 13 | 13 | 13 | 13 | 13 | — |
| Resin | Type | PEI | PA6 | PEI | PEI | PC | PEI |
|  | Ratio (wt %) | 10 | 50 | 80 | 85 | 49 | 100 |
|  | Ratio (vol %) | 18.2 | 69.0 | 88.9 | 91.9 | 67.0 | 100 |
|  | Tg (° C.) | 217 | 50 | 217 | 217 | 153 | 217 |
| Space filling material configuration | Basis weight (g/m$^2$) | 2583 | 1800 | 2688 | 2573 | 1800 | 2410 |
|  | Thickness (mm) | 1.86 | 1.40 | 2.00 | 2.00 | 1.53 | 2.00 |
|  | Density (g/cm$^3$) | 1.390 | 1.286 | 1.340 | 1.289 | 1.176 | 1.210 |
|  | Porosity (%) | 39.8 | 18.3 | 5.0 | 6.1 | 28.3 | 5.0 |
| Physical property of space filling material | Expansion ratio at a constant load (%) | 143 | 204 | 125 | 108 | 251 | — |
|  | Deformation ratio (%) | −0.1 | −0.2 | −0.3 | −0.3 | −0.1 | — |
| Filling property eval. | Filling property | S | S | S | S | S | P |
|  | Expansion ratio after filling (%) | 162 | 214 | 150 | 150 | 196 | — |
|  | Porosity after filling (%) | 62.7 | 61.9 | 36.7 | 37.4 | 63.5 | — |
|  | Density after filling (g/cm$^3$) | 0.858 | 0.601 | 0.893 | 0.859 | 0.600 | — |
| Fixity eval. | Push out load (N) | 110 | 730 | 250 | 30 | 881 | — |
| Liquid permeability eval. (Aces.) |  | E | E | S | S | E | — |
| Liquid permeability eval. (mL/min) |  | 225 | 250 | 5 | 6 | 260 | — |
| Insulation eval. (M) |  | S | S | S | S | S | — |
| Heat resistance eval. (M) |  | S | P | S | S | S | — |

"Deformation ratio" indicates the deformation ratio in the direction perpendicular to the thickness direction In Table 1, GF indicates a glass fiber and CF indicates a carbon fiber.

Table 1 reveals that the space filling materials of Examples 1 to 12 achieve excellent expansibility for filling a predetermined space and high strength (push out load) for fixing the material to be fixed because each of them comprises reinforcing fibers as an expansion material and a resin, and the reinforcing fibers form a plurality of intersections and are bonded with the resin at at least one of the intersections.

Further, the space filling materials of Examples 1 to 7, 9, 10 and 12 are particularly high in strength (push out load) for fixing the material to be fixed because they contain the resin at a volume ratio of 30 to 90 vol % based on the total volume of the reinforcing fibers and the resin.

Comparative Example 1 without reinforcing fibers as an expansion material could not expand as a space filling material, resulting in failing to exhibit stress for physically fixing the material to be fixed. As such, the material of Comparative Example 1 could not fill the predetermined space, and thereby failed to fix the material to be fixed.

Further, the space filling materials in Examples 1 to 12 are excellent in liquid permeability because of their pores after expansion.

The space filling materials in Examples 1 to 6 and 8 to 12 containing glass fibers as reinforcing fibers are excellent in insulating properties. Further the space filling materials in Examples 1 to 8 and 10 to 12 containing the thermoplastic resins each having a glass transition temperature of 100° C. or higher are excellent in heat resistance.

INDUSTRIAL APPLICABILITY

The space filling material according to the present invention is useful for filling a predetermined space enclosed by a member(s) in transportation means, home appliances, industrial machines, buildings, and the like. For example, the space filling material can be used as a reinforcing material that reinforces a member(s), or as a fixing material for fixing a material(s) to be fixed in a predetermined space enclosed by the member(s). Further, the space filling material according to the present invention can be used as a molding material for fixing permanent magnets (materials to be fixed) in a plurality of holes formed in a rotor in a motor (for example, a motor for driving an automobile).

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 11, 21 . . . space filling materials
12, 22 . . . external members
13, 23 . . . spaces
24 . . . material to be fixed
X . . . thickness direction

What is claimed is:
1. A space filling material comprising:
reinforcing fibers as an expansion material, the reinforcing fibers forming a plurality of intersections, and,
a resin bonding at least one of the intersections;
the space filling material generating an expansion stress upon heating in at least a thickness direction such that the space filling material fills a predetermined space, wherein:
the resin is a thermoplastic resin; and
the thermoplastic resin has a glass transition temperature of 100° C. or higher.

2. The space filling material according to claim 1, wherein the space filling material contains the resin at a volume ratio of 15 to 95 vol % based on a total volume of the reinforcing fibers and the resin.

3. A space filling material comprising:
reinforcing fibers as an expansion material, the reinforcing fibers forming a plurality of intersections, and,
a resin bonding at least one of the intersections; and
the space filling material generating an expansion stress upon heating in at least a thickness direction such that the space filling material fills a predetermined space
wherein the reinforcing fibers are in bent forms each receiving a bending load; and
softening of the resin releases the bending load to make the space filling material to be expanded.

4. The space filling material according to claim 1, wherein the space filling material has an expansion ratio of 105% or more at a constant load in the thickness direction.

5. The space filling material according to claim 1, wherein the space filling material after expanded has a deformation ratio of −10% to 10% in a direction perpendicular to the thickness direction.

6. A space filling material comprising:
reinforcing fibers as an expansion material, the reinforcing fibers forming a plurality of intersections, and,
a resin bonding at least one of the intersections; and
the space filling material generating an expansion stress upon heating in at least a thickness direction such that the space filling material fills a predetermined space wherein:
the resin is a thermoplastic resin; and
the thermoplastic resin is at least one of thermoplastic resin selected from a group consisting of a thermoplastic polyimide-based resin, a polyether ketone-based resin, a semi-aromatic polyamide-based resin, a polycarbonate-based resin, a liquid crystal polyester-based resin, a polysulfone-based resin, and a polytetrafluoroethylene-based resin.

7. The space filling material according to claim 1, wherein the reinforcing fibers have a fiber length of 3 to 100 mm.

8. The space filling material according to claim 1, wherein the reinforcing fibers are insulative fibers.

9. The space filling material according to claim 1, wherein the space filling material has a porosity of 3 to 75%.

10. The space filling material according to claim 1, wherein the space filling material has a density of 0.5 to 10 g/cm$^3$.

11. The space filling material according to claim 1, wherein the space filling material is used for fixing a material to be fixed in the predetermined space.

12. A space filling structure comprising the space filling material as recited in claim 11 and a material to be fixed, the material(s) being integrated in contact with at least a part of the space filling material.

13. The space filling structure according to claim 12, wherein the material to be fixed is sandwiched between the space filling materials.

14. A method of using the space filling material as recited in claim 1, the method comprising:
heating the space filling material at a temperature of softening temperature of the resin or higher so as to expand the space filling material in the predetermined space.

15. The method according to claim 14 comprising inserting the space filling material into the predetermined space.

16. A method of using the space filling material as recited in claim 1, the method comprising:
heating the space filling material at a temperature of softening temperature of the resin or higher so as to expand the space filling material(s) in the predetermined space and fix a material to be fixed.

17. The method according to claim 16 comprising inserting the space filling material and/or the material to be fixed into the predetermined space.

18. A method of using the space filling structure as recited in claim 12, the method comprising:
heating the space filling material at a temperature of softening temperature of the resin or higher so as to expand the space filling material(s) in the predetermined space and fix the material to be fixed.

19. The method according to claim 18 comprising inserting the space filling structure into the predetermined space.

20. The method according to claim 14, wherein the expanded space filling material has a porosity of 30 to 95%.

21. The method according to claim 14, wherein the expanded space filling material has a continuous porous structure.

22. The method according to claim 14, wherein the expanded space filling material has a density of 0.1 to 1.5 g/cm$^3$.

* * * * *